April 30, 1968   R. S. BROWN   3,381,260
CRYOGENIC AND THERMAL SEAL FOR ELECTRICAL MEMBERS
Filed March 28, 1966

INVENTOR:
RAY S. BROWN

ATTORNEYS

United States Patent Office 3,381,260
Patented Apr. 30, 1968

3,381,260
CRYOGENIC AND THERMAL SEAL FOR
ELECTRICAL MEMBERS
Ray S. Brown, La Canada, Calif., assignor to Physical
Sciences Corporation, Arcadia, Calif., a corporation of
California
Filed Mar. 28, 1966, Ser. No. 537,753
10 Claims. (Cl. 339—93)

ABSTRACT OF THE DISCLOSURE

This invention relates to an electrical connector which is sealed from external members through an extended range of temperatures. The connector includes a plurality of electrical conductors which extend through a housing for connection to first electrical elements at a first end of the housing and for connection to second electrical elements at a second end of the housing. A first ceramic seal envelopes the electrical conductors at the first end of the casing and abuts the casing to provide a seal between the casing and the conductors. A second ceramic seal envelopes the electrical conductors at the second end of the casing and abuts the casing to provide a seal between the casing and the conductors. The ceramic seals may be provided with characteristics to produce a low leak rate through an extended range of temperatures. A non-solid substance is disposed in the casing between the first and second ceramic seals and is provided with characteristics to prevent the passage of contaminants between the first and second ends of the casing.

---

This invention relates to sealing units for use in cryogenic, high temperature, and other extreme thermal and/or pressure situations. The general purpose of the invention is to provide a seal through which electrical wiring or some other type of conduit can pass with minimum leakage, even after the unit has been subjected to numerous instantaneous changes in pressure and/or temperature.

A particular application for which the inventive concept is well suited is in the construction of receptacle feedthrough assemblies for use as interconnecting devices for instrumentation and thermocouple wires passing through a removable bulkhead plate of a cryogenic containment vessel. In such a situation it is desirable that the receptacle be mounted by means of welding to the bulkhead plate and that the receptacle maintain a high vacuum integrity after passing through both welding and cryogenic thermal shocks. Because of the welding requirement, the outer casing of such a receptacle must often be of a very specific material dictated by the material of the bulkhead plate to which it is welded. This means that only the sealing and electronic conduction materials within the outer casing can be variable. In cryogenic and thermal situations, for example, the storage or liquid hydrogen, such a receptacle may be subjected very suddenly to a temperature change from ambient down to —425° F. or up to +1500° F. It is an object of this invention to perform sealing of electrical wiring or other conduction means passing out of such a cryogenic environment as a liquid hydrogen tank in such manner that the seal will not be broken through many cycles of sudden thermal shocks through the range —425° F. up to +1500° F.

In the achievement of the above and other objects and as a feature of this invention, there is provided an outer casing having first and second ends and having conduction means passing therethrough. The conduction means would ordinarily be for electrical signals, but pipes for the conduction of liquid or gas might also be advantageously sealed using the principles of this invention. At the first end of the outer casing is a first seal which surrounds the conduction means in such manner that electricity may be conducted through the seal. Whenever the inventive principles are being applied to a connecting plug or a receptacle, the conduction means at the outside surface of the first seal would ordinarily have pins or some other sort of male or female interconnection hardware, so that an electrical device outside the receptacle may be plugged thereto.

According to the principles of this invention, at the second end of the casing is a similar seal having the conduction means passing therethrough and having interconnection potentialities for use with connector plugs. Thereafter, within the outer casing mentioned above and contained between the first and second seals is a substance designed to prevent the passage of any leaking fluid that is able to penetrate either the first or second seals. Such a leaking fluid might not be present when the seals are new, but as the seals are subjected to severe thermal shocks or other destructive influences, so that their leakage rate goes up, the substance contained therebetween will serve to block the passage of the leaking fluid that would otherwise pass from either one of the first or second seals to the other and thus totally penetrate through the connector or other device upon which the invention is being practiced.

Other objects and features of this invention and a better understanding thereof may be had by referring to the following description and claims taken in conjunction with the accompanying drawings in which:

Figure 1:
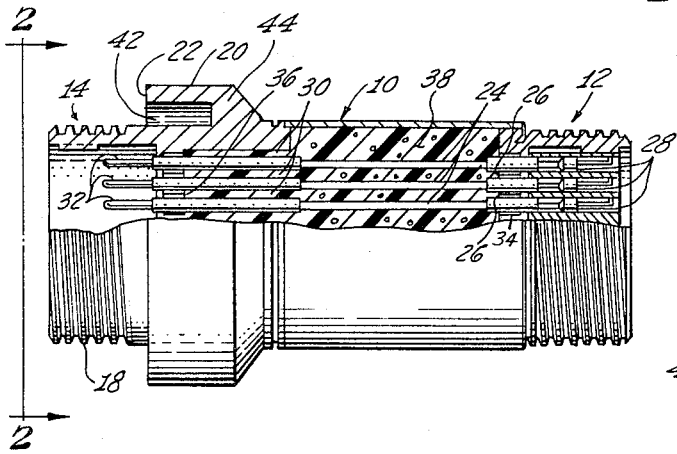
FIGURE 1 is a side elevation partially in cutaway of a preferred embodiment of the instant invention.

Referring to FIGURE 1, the connector shown therein in which the principles of the invention are embodied has an outer casing 10 with a first end shown generally at 12 and a second end shown generally at 14. The first end 12 may be threaded as at 16 in order to provide for the attachment of a connector plug thereto. In like manner, the second end 14 may be threaded as shown at 18 in order to provide interconnection with the end hardware of some conduction means associated therewith. The casing 10 has a shoulder area 20 which has an end 22 adapted to abut a bulkhead or a wall whereon the connector of FIGURE 1 is to be mounted. It is contemplated that the second end 14 would then protrude through the bulkhead.

Running through the casing 10 and coaxial thereto are a series of conducting means, herein shown as electrical conductors 24. At the first end 12 of the casing 10 the conductors 24 pass through tubes 26 to the outside of the receptacles of FIGURE 1, where they terminate in sockets 28 adapted to receive pins from a cooperating connector plug. At the second end 14 of the receptacle of FIGURE 1, the electrical conducting material 24 passes through tubes 30 to terminate in pins 32 which cooperate with receptacles similar to those shown at 28 in some coupling plug to be attached at the end 14.

At the first end 12 of the receptacle of FIGURE 1 the tubes 26 pass through a first seal 34 which will be described in greater detail hereinafter. At the second end 14 of the receptacle of FIGURE 1 the tubes 30 pass through a second seal 36 in the receptacle of FIGURE 1. The seals 34 and 36 cooperate with the casing 10 to provide a hermetically sealed area through which the electrical connectors 24 pass. As a feature of this invention, this area is packed with a substance 38 to be described in greater detail hereinafter. The principle of selection of this substance is that it be deformable in order to fill all the space surrounded by the casing 10 and seals 34 and 36 and yet have sufficient consistency so that it will not escape should small leaks arise in the seals 34 and 36 and, moreover, so that it will resist the passage of fluids—liquids or gases—through the receptacle of FIGURE 1 should small breaks occur in the seals 34 or 36 as the receptacle is subjected to extreme thermal shocks and other disturbing occurrences.

Figure 2:
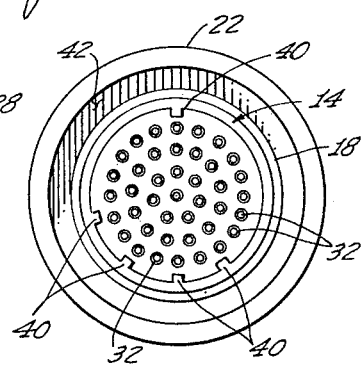
FIGURE 2 is an end view of the connector assembly shown in FIGURE 1.

Referring to FIGURE 2, an end view of the receptacle of FIGURE 1 shows the cylindrical configuration of the casing 10 and shoulder 22. The pins 32 and electrical connectors 24 may be arranged in any convenient configuration and may be of varying materials, the principles of selection of which will be explained further below. A number of keying means such as the ears 40 shown in FIGURE 2 may be used in order to provide proper orientation between connecting plugs upon their being fitted together at each end of the receptacle of FIGURE 1.

It can be seen that the receptacle of FIGURE 1 is easily adapted for being welded to a bulkhead plate having a circular opening therein through which the end 14 of the receptacle of FIGURE 1 would protrude. As a feature of the invention, the thermal characteristics of the receptacle material and the integrity of the first and second seals 34 and 36 are protected by having the shoulder 22 separated from the main body of the casing 10 by a space 42, so that the heat applied to the shoulder 22 during the welding operation will not be conducted directly down to the seal 36 or the casing 10. Rather, it will be conducted backward to a large bulky area 44 which will more readily absorb and dissipate it without seriously altering the characteristics of the receptacle.

In order to best perform the invention and provide the most thorough sealing over long periods of time and repeated cycles of thermal shock, the material of the casing 10 should be carefully matched with the material used in the bulkhead plate to which the receptacle of FIGURE 1 is to be welded. For example, the casing 10 may be made from "Inconel X750" stainless steels (preferably of the 300-series, but also of the 400-series) or aluminum. In particular, the material of the shoulder 22 should be compatible for welding purposes with the material of the bulkhead to which the receptacle is to be mounted and should have substantially the same thermal coefficient of expansion, so that no breaks in the weld occur under repeated thermal shock.

Since the material of the casing 10 is fixed by factors other than the desired vacuum integrity of the receptacle itself, the selection of the other materials contained inside the casing 10 must be carefully performed if a receptacle such as that shown in FIGURE 1 is to perform adequately. A first principle of material selection is to use a material for the conductor 24, the sockets 28, and/or the pins 32 that has the same or a slightly lower thermal coefficient of expansion than the material used in the casing 10. Since the conducting material 24 is somewhat slidable through the tubes 26 and 30 and since the sockets 28 and the pins 32 can make a slight withdrawal from their mating elements in connector plugs outside the receptacle of FIGURE 1 without impairing electrical conduction, the slightly lower thermal coefficient of expansion reduces the danger of distortion or cracking that might occur should the conducting elements 24 expand more than the shell 10.

For purposes of maintaining the integrity of the seals 34 and 36 as extreme thermal shocks are repeatedly applied, it has been found most advisable to use a ceramic seal featuring a ceramic formulation of high strength and high density. Furthermore, the ceramic seal 34 or 36 should have a very high temperature softening and melting point (upwards of 1500° F.) and should have a fairly high thermal coefficient of expansion.

In addition, for successful practice of the invention in very critical applications it is essential that the material chosen for both the conducting elements 24, 28, and 32 and for the surrounding casing 10 be immune to the effects of welding at 22 and be able to maintain adequate surface conditions as far as oxidation and similar corrosion are concerned over long periods of time and through the wide and sudden heat swings described above. Moreover, the materials should be suitable for appropriate surface preparation, such as special cleanup, pre-oxidation, and the like, and should be free from cracks or other defects that might ultimately break the conduction path or permit leaks in the seals around the conduction path of the receptacle of FIGURE 1.

A receptacle built according to the design of FIGURE 1 and incorporating the above-discussed principles used pins 24 of either 300-series stainless steel or Inconel. The seals 34 and 36 were of the "Durock" type of seal as disclosed and claimed in copending application Ser. No. 21,525, filed on Apr. 11, 1960, now Patent No. 3,307,958, in the name of John A. Earl, as sole inventor, and assigned of record to the assignee of this application, or application Ser. No. 381,541, filed on July 9, 1964, in the name of John A. Earl, as sole inventor, and assigned of record to the assignee of this application, or application Ser. No. 288,440, filed on June 17, 1963, in the name of John A. Earl, as sole inventor, and assigned of record to the assignee of this application. The seals 34 and 36 were able to perform without impairment from temperatures up to and above 1500° F. The receptacle of FIGURE 1 built according to the specifications showed a helium leak test rate of less than $1 \times 10^{-9}$ cc./He/sec. Even after more than 1,000 thermal shock cycles of the type mentioned above, the helium leak test rate was still less than $2 \times 10^{-18}$ cc./He/sec. These tests were performed after the receptacle had operated up to a proof pressure differential of 275 p.s.i.

As stated above, an important feature of the invention is the selection and insertion of the material 38 contained within the casing 10 between the first and second seals to block the passage of leakage fluids therebetween. A preferred material for this purpose is a compound made by the assignee of record of this application and designated as "Duraplastic." Such a compound complies with the principles of this invention in being resilient and neither fully liquid nor hard, but, rather, extremely viscous, so that it can absorb shock and vibration. The material designated as "Duraplastic" can also expand and contract with temperature, yet at the same time intercept and prevent the passage of contaminants leaking through either the first seal 26 or the second seal 36 of the receptacle of FIGURE 1. A material having these characteristics is disclosed and claimed in copending application Ser. No. 453,418, filed in the name of Joseph M. McManus on May 5, 1965, and assigned of record to the assignee of this application.

The material designated as "Duraplastic" and used in the position 38 shown in FIGURE 1 tends to fill all the space in which it is contained and thus can adapt when cracking or other dislocations occur due to extreme temperature or mechanical shocks imposed upon the receptacle. Thus by the redundancy-safety approach of using the first seal 34, the second seal 36, and also the viscous material 38 therebetween, a connector plug according to this invention gives almost perfect assurance that contaminants will not be exchanged between the ambient volumes associated with the first end 12 and the second end 14. In tests of connectors according to the design of FIGURE 1, 0.9995 reliability was achieved, using for a standard the leak rate of $2 \times 10^{-8}$ cc./He/sec., after 50 cycles of thermal shock.

Figure 3:
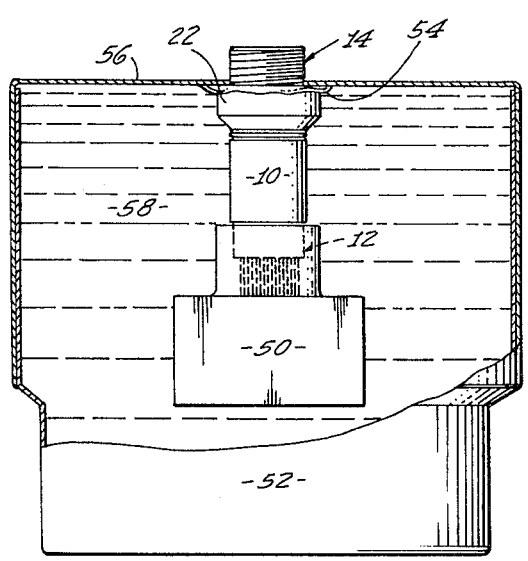
FIGURE 3 illustrates the mounting of the connector of FIGURE 1 in a typical cryogenic application thereof.

Referring to FIGURE 3, a typical application for which the connector of FIGURE 1 might be used is for conducting instrumentation signals from an instrumentation package 50 mounted within a cryogenic storage tank 52 to the outside of the storage tank 52, where a connector plug may be attached. Accordingly, the shoulder 22 is shown brazed as represented at 54 to one bulkhead 56 of the cryogenic tank 52. The tank might typically contain a low temperature liquid 58, such as liquid hydrogen. Since liquid hydrogen has a temperature of 425° F., when it is inserted in the tank 52, a thermal shock of approximately 500° F. occurs almost instantaneously. In such a situation an ordinary single-seal receptacle, even of the best ceramic variety, would degenerate to an excessive degree in its sealing characteristics. On the other hand, for leakage to occur through the receptacle of FIGURE 1, the contaminating or escaping materials would have to pass not only through both seals 26 and 36, but also through the compound 38 packed therebetween. Long experimentation with the arrangement shown in FIGURE 3 has demonstrated that such contamination is rarely unable to come about.

Thus applicant has achieved a method of sealing for use with electrical plug receptacles or other connecting units passing through the bulkheads of the sort shown at 56 wherein even after the unit has been subjected to numerous thermal shocks or mechanical or pressure shocks, good sealing is still accomplished. The material-selection principles of the invention make it possible to provide a receptacle compatible with all the common materials which might be found in the bulkhead 56 and yet maintain a high vacuum integrity after passing through both welding and cryogenic thermal shocks. It should be emphasized that the connector receptacle of FIGURE 1 could be easily converted to a thermocouple or other sensor insertable through the bulkhead 56. In such a situation, conductivity elements 24 ought to be an appropriate combination of copper and constantan metals or a combination of chromium and Alumel (manufactured by Haskins Manufacturing Company of New Jersey) or a combination of platinum and platinum-rhodium.

Although the invention has been described in its preferred form with a certain degree of particularity, it should be understood that the present disclosure of the preferred form has been made only by way of example and that numerous changes in the details of the construction and in the combination and arrangements of parts may be resorted to without departing from the spirit and scope of the invention as hereinafter claimed.

I claim as my invention:

1. A connector for conducting electrical signals through a wall between first and second conductive elements, comprising:

an outer casing having first and second ends, means on said outer casing and near the first end of said casing for abutting said wall for attachment to the wall to hold said connector to the wall, electrical signal conduction means mounted within said casing and passing from said first end of said casing to said second end of said casing and having first portions at the first end of the casing for connection to the first conductive elements and having second portions at the second end of the casing for connection to the second conductive elements, first sealing means at the first end of said casing, the first sealing means being made from an electrically insulating material and enveloping said electrical signal conduction means and disposed relative to said electrical signal conduction means and said casing to provide a seal between the electrical signal conduction means and the casing, second sealing means at the second end of said casing and disposed relative to said electrical signal conduction means and said casing to provide a seal between the electrical signal conduction means and the casing, and a non-solid substance packed within said casing between said first sealing means and said second sealing means and having viscous and resilient properties to facilitate the production of seals between the first and second sealing means.

2. The combination of claim 1 wherein the non-solid substance has the characteristic of resisting fluid flow between said first seal and said second seal and also the characteristics of resiliently deforming to maintain full occupation of the volume contained by the outer casing, the first sealing means, and the second sealing means.

3. The combination of claim 1 wherein the first sealing means and the second sealing means hermetically seal the non-solid substance and wherein the non-solid substance resists fluid flow between the first sealing means and said second sealing means.

4. The combination of claim 1 wherein said outer casing and said electrical signal conduction means are made of materials having thermal coefficients of expansion that are approximately equal and the first and second sealing means having properties of providing an effective seal at a leak test rate less than $1 \times 10^{-9}$ cc./He/sec. through a temperature range between approximately $-425°$ F. to approximately 1500° F.

5. A connector for conducting electrical signals through a wall between first and second conductive elements, comprising:

an outer casing having first and second ends, means on said outer casing and near the first end of said casing for abutting said wall for attachment to the wall to hold said connector to the wall, electrical signal conduction means mounted within said casing and passing from said first end of said casing to said second end of said casing and having first portions at the first end of the casing for connection to the first conductive elements and having second portions at the second end of the casing for connection to the second conductive elements, a first ceramic seal at the first end of said casing, the first ceramic seal having electrically insulating properties over an extended range of temperatures and enveloping said electrical signal conduction means and disposed relative to said electrical signal conduction means and said casing to seal said electrical signal conduction means and said casing, a second ceramic seal at the second end of said casing, the second ceramic seal having electrically insulating properties over an extended range of temperatures and enveloping said electrical signal conduction means and disposed relative to said electrical signal conduction means and said casing to seal said electrical signal conduction means and said casing, and a substance constituting neither a solid nor a liquid, said substance being packed within said casing between said first ceramic seal and said second ceramic seal, said substance having characteristics relative to the first and second ceramic seals to be unable to penetrate said first and second seals, yet having the characteristic of preventing the passage of molecules of fluid through the substance and having viscous and resilient properties to resist mechanical shock and vibration and having properties of resisting thermal shock over an extended range of temperatures.

6. The connector of claim 5 wherein the wall is part of a pressurized tank and wherein the abutting means is constructed to abut the surface of the wall inside the tank and the first end of the casing protrudes through the wall.

7. The connector of claim 5 wherein the ceramic material in said first and second ceramic seals has a high thermal coefficient of expansion and provides an effective seal with a leak test rate less than $1 \times 10^{-9}$ cc./He/sec. through an extended range of temperatures between approximately $-425°$ F. and 1500° F.

8. In combination for connection to first and second electrical elements:

an outer casing having first and second ends, conduction means mounted within said casing and passing from said first end of said casing to said second end of said casing for connection at the first end to the first electrical elements and for connection at the second end to the second electrical elements, a first seal at the first end of said casing, the first seal being made from a ceramic material having a high thermal coefficient of expansion, the first seal enveloping said conduction means and disposed in abutting relationship to the casing to provide a seal between the conduction means and the casing, a second seal at the second end of said casing, the second seal being made from a ceramic material having a high thermal coefficient of expansion, the second seal enveloping said conduction means and disposed in abutting relationship to the casing to provide a seal between the conduction means and the casing, and a substance packed within said casing between said first seal and said second seal, said substance constituting neither a liquid nor a solid and having characteristics to be unable to penetrate said first and second seals yet having the characteristic of preventing the passage of molecules of fluid through the substance.

9. The combination set forth in claim 8 wherein the substance is viscous and resilient to resist mechanical shock and vibration.

10. The combination set forth in claim 9 wherein the substance has properties of absorbing thermal shock through an extended range of temperatures and wherein the ceramic material has properties of providing an effective seal providing a leak test rate of less than $1 \times 10^{-9}$ cc./He/sec. through an extended range of temperatures between approximately $-425°$ F. and $1500°$ F.

References Cited

UNITED STATES PATENTS

| | | |
|---|---|---|
| 1,731,597 | 10/1929 | Spear. |
| 1,829,207 | 10/1931 | Adleman _____ 339—126 |
| 2,638,573 | 5/1953 | Glickman et al. |
| 2,674,645 | 4/1954 | Fine. |
| 2,700,140 | 1/1955 | Phillips. |
| 2,700,141 | 1/1955 | Jones. |
| 2,701,867 | 2/1955 | Obenschain et al. |
| 3,158,680 | 11/1964 | Lovitt et al. |

FOREIGN PATENTS

| | | |
|---|---|---|
| 661,512 | 4/1963 | Canada. |
| 955,432 | 4/1964 | Great Britain. |

RICHARD E. MOORE, *Primary Examiner.*